United States Patent
Grohmann et al.

(10) Patent No.: US 10,442,042 B2
(45) Date of Patent: Oct. 15, 2019

(54) METHOD AND DEVICE FOR DETERMINING THE ELONGATION AND/OR COMPRESSION OF A PROFILED SEALING ELEMENT

(71) Applicant: TESLA GROHMANN AUTOMATION GMBH, Prüm (DE)

(72) Inventors: Klaus Grohmann, Hersdorf (DE); Lothar Kotz, Prüm (DE); Michael Gilles, Müllenbach (DE)

(73) Assignee: TESLA GROHMANN AUTOMATION GMBH, Prüm (DE)

( * ) Notice: Subject to any disclaimer, the term of this patent is extended or adjusted under 35 U.S.C. 154(b) by 301 days.

(21) Appl. No.: 15/506,193

(22) PCT Filed: Jul. 31, 2015

(86) PCT No.: PCT/EP2015/067662
§ 371 (c)(1),
(2) Date: May 2, 2018

(87) PCT Pub. No.: WO2016/030131
PCT Pub. Date: Mar. 3, 2016

(65) Prior Publication Data
US 2018/0222001 A1 Aug. 9, 2018

(30) Foreign Application Priority Data

Aug. 26, 2014 (DE) ........................ 10 2014 112 185

(51) Int. Cl.
*B23P 19/04* (2006.01)
*B60J 10/35* (2016.01)
(Continued)

(52) U.S. Cl.
CPC ............. *B23P 19/047* (2013.01); *B60J 10/35* (2016.02); *B60J 10/45* (2016.02); *B65H 35/006* (2013.01);
(Continued)

(58) Field of Classification Search
CPC .............. B65H 35/0013; B65H 35/006; B65H 35/0066; B65H 35/0093; B65H 63/08; B60J 10/35; B60J 10/45; B29P 19/047
See application file for complete search history.

(56) References Cited

U.S. PATENT DOCUMENTS 8,398,808 B2    3/2013  Grohmann et al.
2009/0301634 A1* 12/2009  Malecki ................ B23P 19/047
                                                156/64

FOREIGN PATENT DOCUMENTS

CN        101568442 A    10/2009
CN        203687911 U     7/2014
(Continued)

OTHER PUBLICATIONS

Translation of DE 102006032138 A1 (Year: 2007).*
(Continued)

*Primary Examiner* — George R Koch
(74) *Attorney, Agent, or Firm* — Lucas & Mercanti, LLP

(57) ABSTRACT

A method for determining the elongation and/or compression of a profiled sealing element applied to a body includes drawing the profiled sealing element, which exists as an endless profiled element, from a store and, with the help of an application roller and by means of an adhesive surface present on the profiled sealing element, rolling the profiled sealing element onto the body part along a line intended for the attachment. A measuring roller, which rolls on the profiled sealing element without slip, is arranged at a small distance before a drive system for the profiled sealing element. The length sensed by the measuring roller corresponds to the length of the profiled sealing element applied to the body along an application distance having a defined length.

22 Claims, 4 Drawing Sheets

(51) Int. Cl.
*B60J 10/00* (2016.01)
*B65H 35/00* (2006.01)

(52) U.S. Cl.
CPC ...... *B65H 35/0013* (2013.01); *B65H 35/0093* (2013.01)

(56) References Cited

FOREIGN PATENT DOCUMENTS

| | | |
|---|---|---|
| DE | 10138781 A1 | 2/2003 |
| DE | 102006032138 A1 | 8/2007 |
| DE | 102007058839 A1 | 8/2009 |
| DE | 102011050751 A1 | 12/2012 |
| EP | 0894563 A2 | 2/1999 |
| EP | 1902813 A1 | 3/2008 |
| WO | 2006111489 A1 | 10/2006 |
| WO | 2008037426 A1 | 4/2008 |

OTHER PUBLICATIONS

Translation of EP 0894563 A2 (Year: 1999).*
Translation of WO 2006/111489 A1 (Year: 2006).*
International Preliminary Report on Patentability, dated Feb. 28, 2017, 6 pages (English translation).

* cited by examiner

METHOD AND DEVICE FOR DETERMINING THE ELONGATION AND/OR COMPRESSION OF A PROFILED SEALING ELEMENT

CROSS-REFERENCE TO RELATED APPLICATIONS

This application is a 371 of PCT/EP2015/067662 filed Jul. 31, 2015, which in turn claims the priority of DE 10 2014 112 185.6 filed Aug. 26, 2014, the priority of both applications is hereby claimed and both applications are incorporated herein by reference.

BACKGROUND OF THE INVENTION

The invention relates to a method for determining the elongation and/or compression of a self-adhesive sealing profile applied to a body or body part of a vehicle and to a device for implementing the method.

Sealing profiles on vehicles or vehicle parts serve to seal a movable vehicle part such as a vehicle door against the body frame when the movable part is closed.

A method and a device for applying a sealing profile to a vehicle door is known from DE 101 38 781 A1, in which the self-adhesive sealing profile, provided as an endless profile on a roll, is pulled from the roll and, with its adhesive surface facing the door, is rolled onto a line intended to receive it extending around the periphery of the door. The expression "rolled onto" means that the sealing profile is pressed by an application roller progressively along the surface of the vehicle door, following a predefined installation line and thus attached to the door. The advantage of this rolling method is that the entire seal can be applied in a single continuous work step. The attachment is achieved in that the body or the body part and the application roller are moved relative to each other at a certain speed. It doesn't matter whether the vehicle body or the part of the body is moved relative to an application roller mounted in a stationary position or whether the application roller is moved relative to the vehicle body or part of the vehicle body being held in a stationary position.

The sealing profile to be applied is a so-called "self-adhesive" endless sealing profile. On the side facing the application surface, the sealing profile comprises an adhesive surface, in particular in the form of an adhesive tape. The adhesive surface is covered by a protective strip, in particular a protective film, referred to as a "liner". The protective strip is peeled off shortly before application. As a result, the adhesive surface is exposed.

Depending on the geometry of the body part, in particular on the geometry of the door, the applied sealing profile must comprise a predefined elongation/compression along an application distance of defined length, so that a permanent attachment to the body part is ensured. In the case of complex geometries, the sealing profile can be applied in a single work step along several application distances arranged in succession, wherein the door sealing profile must comprise a different elongation or compression in each of the various application distances.

To bring about effectively the desired elongation or compression of the adhered sealing profile, the sealing profile can be conveyed at an increased or decreased conveying speed in the direction toward the application roller. In addition, by setting the traveling speed of the arm of the robot which either moves the body part along the stationary application roller or the movable application roller along the stationary body part, the relative speed between the application roller and the body part can be effectively influenced in order to bring about an elongation or compression in the sealing profile.

According to the prior art, the elongation and/or compression of the applied sealing profile is measured by means of the so-called "cutting test" as follows (compare FIG. 1):

The sealing profile 1 is applied to a test body part 4 removed from current production.

The applied sealing profile 1 is cut at least at one point, preferably at several points, by means of a sharp knife transversely to the longitudinal dimension.

On both sides of the cut, the sealing profile 1 is peeled away over a length of 100 mm from the surface of the body part to which it has been applied.

The adhesive surfaces of the peeled-away parts of the sealing profile 1 are covered with soft paper 3, so that the peeled-away parts of the door sealing profile cannot stick to the application surface again.

After a relaxation phase of up to 15 minutes, any elongation/compression which may have occurred in the sealing profile 1 becomes visible in that (if elongation has occurred) a gap shows up between the two ends of the peeled-away sealing profile 1 when they are brought together, or (if compression has occurred) the two ends press against each other when the two ends are brought together.

The size 5 of the gap, i.e., of the elongation, is measured with a sliding caliper.

This known, spot-check-like, destructive measurement of sealing profiles on test doors does not make it possible to exercise complete control over the application method. This results in a lack of detection sharpness between two destructive tests which makes it impossible to exercise complete control. Because test doors must be used for the spot checks, furthermore, not all possible sources of error can be detected. If, for example, the surface of the test door selected for the spot check deviates from the door in the current production process, elongations and/or compressions resulting from these deviations cannot be detected. Finally, the production process is slowed down by the need to interrupt production so that the test doors can be taken from the line for the following measurement of the elongation and/or compression.

BRIEF SUMMARY OF THE PRESENT INVENTION

Against the background of this prior art, an object of the invention is to create a method for determining the elongation and/or compression of a self-adhesive sealing profile applied to a body or a body part of a vehicle, which method makes it possible to determine the elongation and/or compression of all applied sealing profiles continuously and nondestructively without any interruption of operations and in particular without the use of personnel or material. In addition, a device for implementing the method is also to be provided.

A measuring roller, which rolls along a sealing profile without slip, is located a short distance in front of, i.e., upstream of, the drive system for the sealing profile. Because the measuring roller is located where it is and because it rolls along the sealing profile without slip, the length detected by the measuring roller of the measurement pick-up corresponds to the length of the sealing profile applied to the body part or body along an application distance of defined length.

If the measured length is longer than the application distance, the sealing profile is compressed. If the measured length is shorter than the application distance, the sealing profile is elongated.

The measurement pick-up comprises not only the measuring roller but also an encoder, which converts the rotation of the measuring roller into electrical signals. Encoders of this type can be configured as optical, magnetic, or mechanical transducers, which recognize the current position of the shaft of the measuring roller and transmit it as an electrical signal. In one embodiment, the measuring roller and the encoder are separate units connected to each other by a flexible shaft. However, the encoder and the measuring roller can also be configured as a single, integrated unit.

So that the seal can be applied without tension, the nominal length of the sealing profile to be applied along the application distance should correspond to the application distance. If the seal is elongated upon installation, the nominal length will be shorter than the application distance. If the seal is compressed upon installation, the nominal length will be longer than the application distance. To detect a deviation in the elongation and/or compression as a function of a predefined tension of the applied seal along an application distance, the measured length of the sealing profile pulled from the storage is compared, upon completion of the application of the sealing strip to the application distance, with the nominal length of the sealing profile to be applied to the application distance, wherein a compression of the sealing profile in the application distance versus the nominal length of the sealing profile to be applied is present when the measured length is greater than the nominal length, and an elongation of the sealing profile in the application distance versus the nominal length of the sealing profile to be applied is present when the measured length is shorter than the nominal length.

The comparison of the measurement values with the nominal lengths is automated; in particular it is carried out by means of electronic data processing.

If the comparison shows that the measured length of the pulled-off sealing profile is greater than or less than the nominal length, a signal can be transmitted automatically when a predefined difference value is exceeded. The signal can be displayed in particular on a graphic user interface, and/or an acoustic signal can be emitted to inform the worker on the automobile production line that an excessive, unallowable amount of compression or elongation is present.

In the case of complex body parts or bodies, which result in a complex 3-dimensional course of the application line, the sealing profile can be applied in a single work step along several application distances arranged in succession, wherein different values for the elongation or compression are assigned to the individual application distances. The comparison of the measured length with the associated nominal length is carried out separately for each individual application distance in succession.

To avoid compression or elongation of the sealing profile in the section of the transport path of the application device between the drive system and the application roller, the sealing profile is preferably conveyed along the transport path in the same direction at the same speed through both the drive system and the application roller.

If the sealing profile nevertheless becomes compressed between the drive system and the application roller, the sealing profile usually forms a loop in this area. In an advantageous embodiment of the invention, this loop formation can also be monitored by a sensor capable of detecting loops. An especially suitable sensor is a laser sensor arranged on the applicator head, which can detect a change in the distance between the surface of the sealing profile and the sensor and immediately stop the application of the sealing profile when it determines that the sealing profile has formed a loop.

To prevent the measurements made by the measuring roller from being falsified by elongation or compression of the sealing profile in the transport path between the measuring roller and the drive system, the length of the sealing profile pulled off the storage is measured as close as possible to the drive system, i.e., at a distance of no more than 0.25 m, and preferably of no more than 0.1 m.

To guarantee that the measuring roller rolls without slip and thus that the measurement of the length of the sealing profile pulled from the storage is not falsified, a knurled measuring roller is used according to the invention. The knurling provided on the circumference of the measuring roller, i.e., on the lateral surface of the roller, is configured in such a way that a positive connection is produced between the lateral surface of the roller and the sealing profile. The knurling can for this purpose comprise a plurality of sharp teeth, which engage positively in the sealing profile.

To avoid permanent damage to the sensitive sealing profile, the knurled measuring roller preferably rolls along the protective strip on the sealing profile, this protective strip being peeled off in the section of the transport route between the drive system and the application roller just before the sealing profile is applied. The teeth of the knurling engage exclusively with the protective strip and the adhesive layer covered by the protective strip. This guarantees that the protective layer applied to the sealing profile, in particular an anti-friction coating, is not damaged. That the measuring roller rolls only along the protective strip makes the measurement nondestructive, which allows continuous measurement during production and thus continuous detection of all sources of error with respect to elongation or compression of the applied sealing profiles.

BRIEF DESCRIPTION OF THE DRAWINGS

The method and in particular a device for implementing the method are explained in greater detail below on the basis of the figures.

DETAILED DESCRIPTION OF THE PREFERRED EMBODIMENTS

Figure 1:
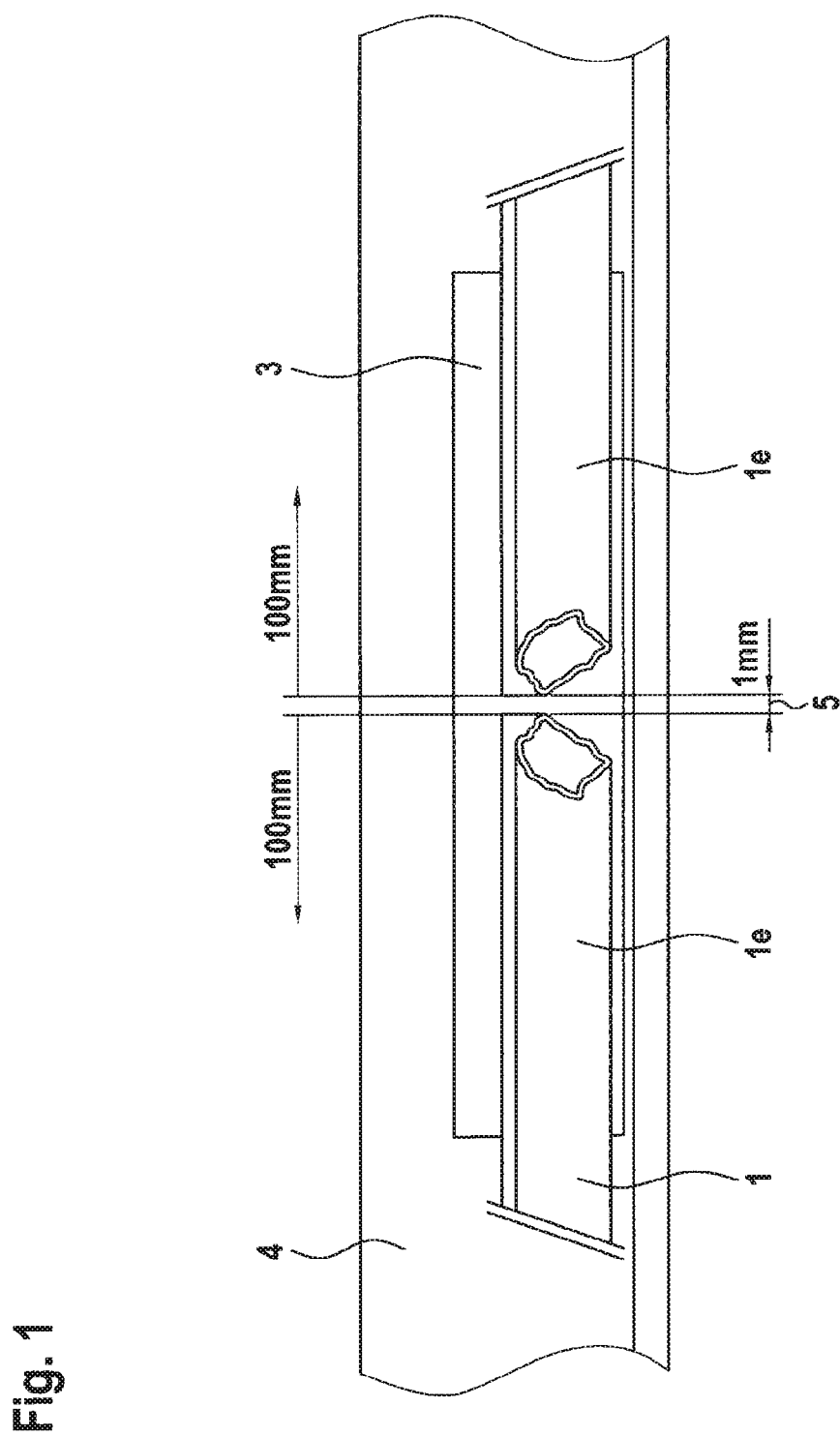
FIG. 1 is a schematic diagram of a sealing profile that has been cut according to the prior art cutting test.
Figure 2:
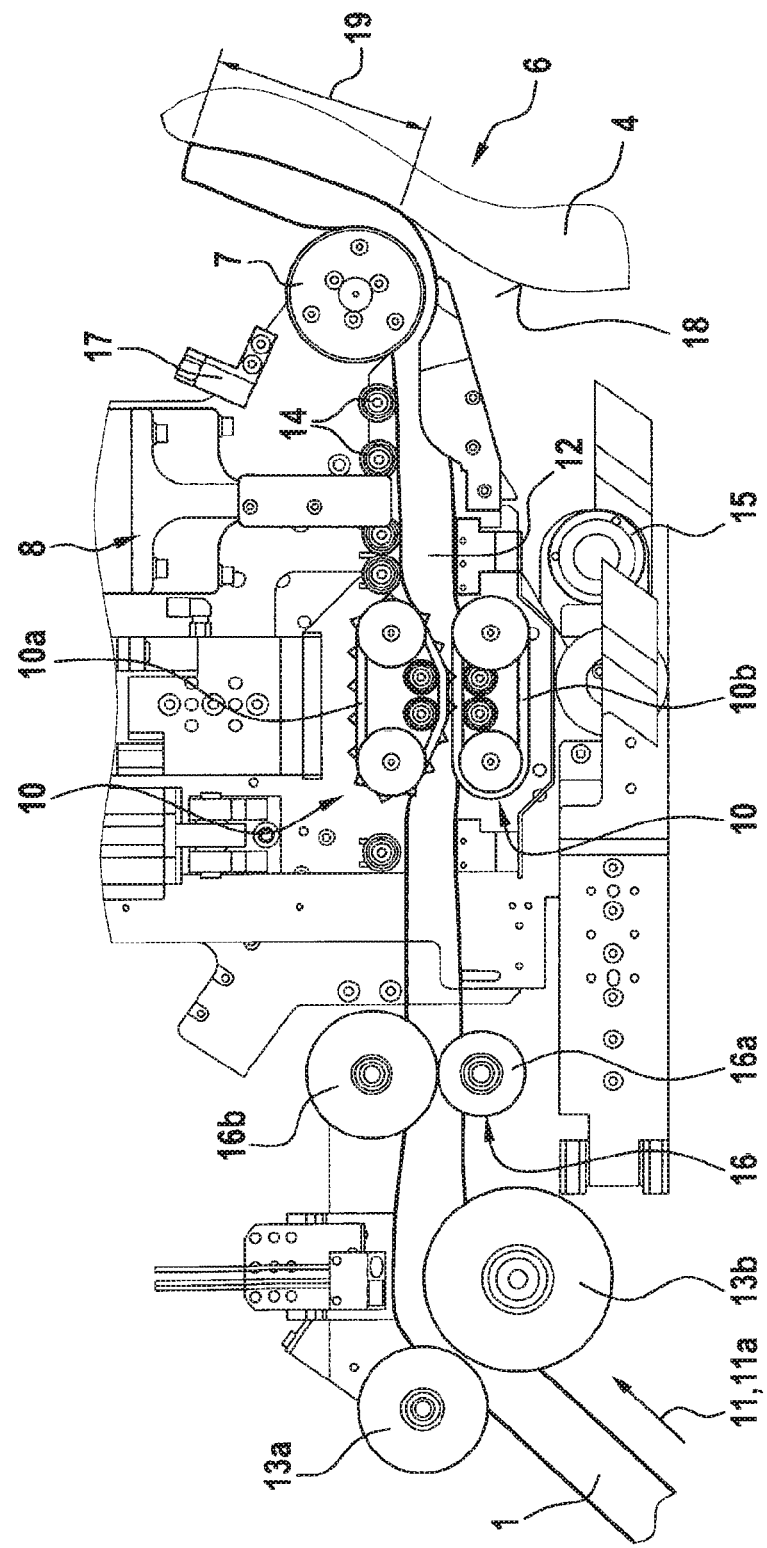
FIG. 2 is an overall side view of the robot-guided applicator head of an application device according to an embodiment of the present invention.

FIG. 2 shows an application device 6, which comprises a robot-guided applicator head 8 with an application roller 7, which is equipped for the rolling-on of a sealing profile 1 carrying an adhesive strip 1c onto a body part 4 of a vehicle.

The sealing profile 1 in question is a self-adhesive sealing profile. The sealing profile 1 comprises a lip 1a and an empty chamber 1b. The adhesive strip 1c, by means of which the sealing profile 1 is adhered to the body part 4, in particular a door, is applied on the side of the lip 1a facing away from the empty chamber 1b. The adhesive strip 1c is originally provided with a protective strip 1d, which is peeled off from the adhesive strip 1c shortly before the profile is applied by the application roller 7.

The applicator head 8 also comprises a drive system 10, which is set up to pull the sealing profile 1 from a storage (not shown) and to convey the sealing profile 1 along a transport path 11 in the direction toward the application roller 7. The drive system 10 comprises two endless belts 10a, 10b, which can be brought into frictional contact with the opposite sides of the surface of the sealing profile 1.

Directly downstream from the drive system 10 in the conveying direction 11a is a guide channel 12 for feeding the sealing profile to the application roller 7. The guide channel 12 is formed by upper and lower guide rollers resting on the top and bottom surfaces of the sealing profile and lateral guide rollers resting against the sides of the profile. For the details, reference is made to the structure of the guide channel 12 described in DE 10 2011 050 751 A1, the disclosure of which is explicitly included in this application.

Downstream from the guide channel 12 in the conveying direction 11a is another component of the guidance system for the sealing profile 1, namely, a roller arrangement 14, which acts to prevent the profile from backing up at the application roller 7. For the construction of this roller arrangement 14, reference is again made to DE 10 2011 050 751 A1, the disclosure content of which is also explicitly included in this application.

Lower and upper guide rollers 13a, 13b, which rest on the top and bottom surfaces of the sealing profile to guide the sealing profile 1 along the transport path 11 from the storage to the application roller 7, are located upstream from the drive system 10 relative to the conveying direction.

The takeoff 15 for peeling the protective strip 1d from the adhesive strip 1c of the sealing profile 1 is arranged along the transport path 11 between the drive system 10 and the application roller 7. The takeoff comprises in particular a driven takeoff roller, which, in this exemplary embodiment, is arranged on the applicator head 8 under the transport path 11 between the drive system 10 and the application roller 7 and over which the protective strip 1d is guided.

A measurement pick-up 16 is also arranged on the applicator head 8, upstream from the drive system 10 relative to the conveying direction 11a of the sealing profile 1. The measurement pick-up 16 comprises a measuring roller 16a rolling without slip along the sealing profile 1, a guide roller 16b forming a counter-support for the measuring roller 16a, and an encoder, which converts the rotations of the shaft of the measuring roller 16a into electrical signals. The measurement pick-up 16 also comprises a drive 16d, in particular in the form of a pneumatic cylinder, which acts in the direction toward the guide roller 16b and thus in the direction toward the sealing profile 1. The drive 16d is preferably controlled in such a way that the measuring roller 16a is pressed with a constant force against the sealing profile 1. Alternatively, the measuring roller 16a can be supported on a spring-loaded pressing lever. The spring pushes against the lever, which is supported on the applicator head pivotably around an axis and thus swings in the direction toward the sealing profile 1, i.e., toward the guide roller 16b on the opposite side of the sealing profile 1.

To guarantee that the measuring roller 16a rolls smoothly along the surface of the protective strip 1d of the sealing profile 1, the guide roller is configured in the manner of a flanged spool, wherein the disks arranged on the ends of, and projecting beyond, the cylindrical core come to rest on the side surfaces of the sealing profile 1. As a result of this embodiment, the guide roller 16b cooperates with the measuring roller 16a to form a guide channel, through which the sealing profile 1 passes with guidance on all sides. The core and the disks of the guide roller 16b are provided with smooth surfaces to prevent damage to the surface of the sealing profile 1.

Figure 3:
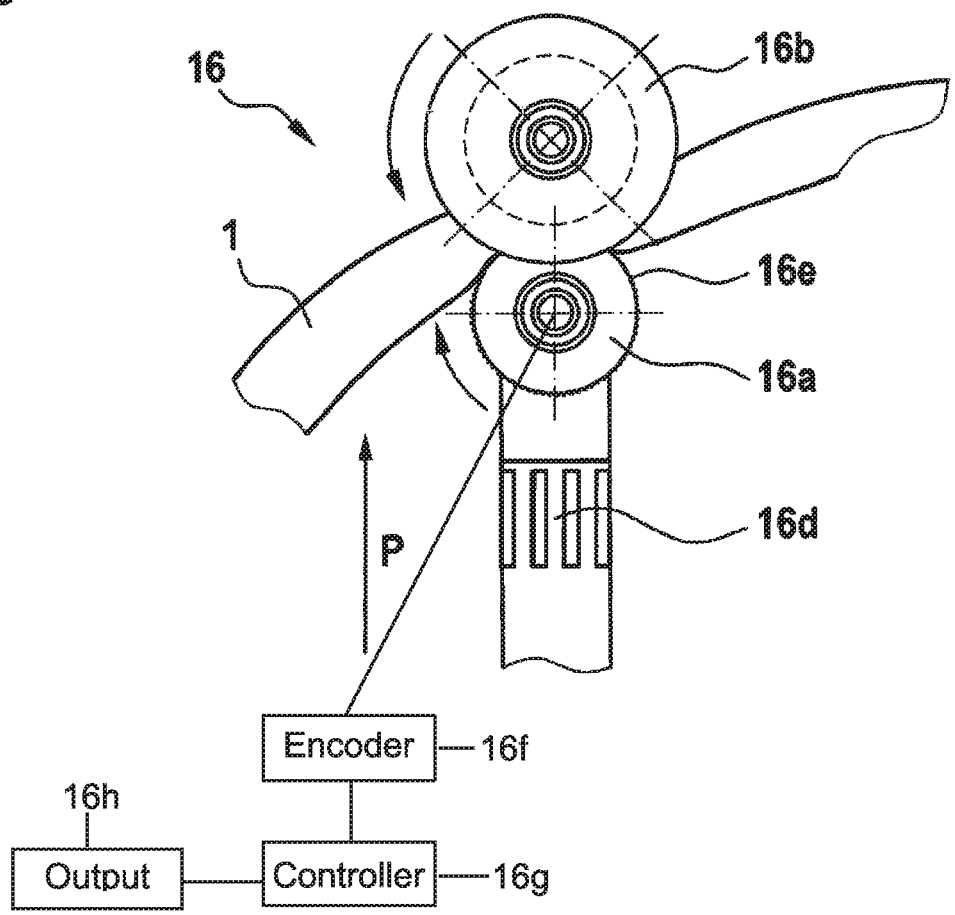
FIG. 3 is a side view of a measurement pick-up of the application device comprising a measuring roller.
Figure 4:
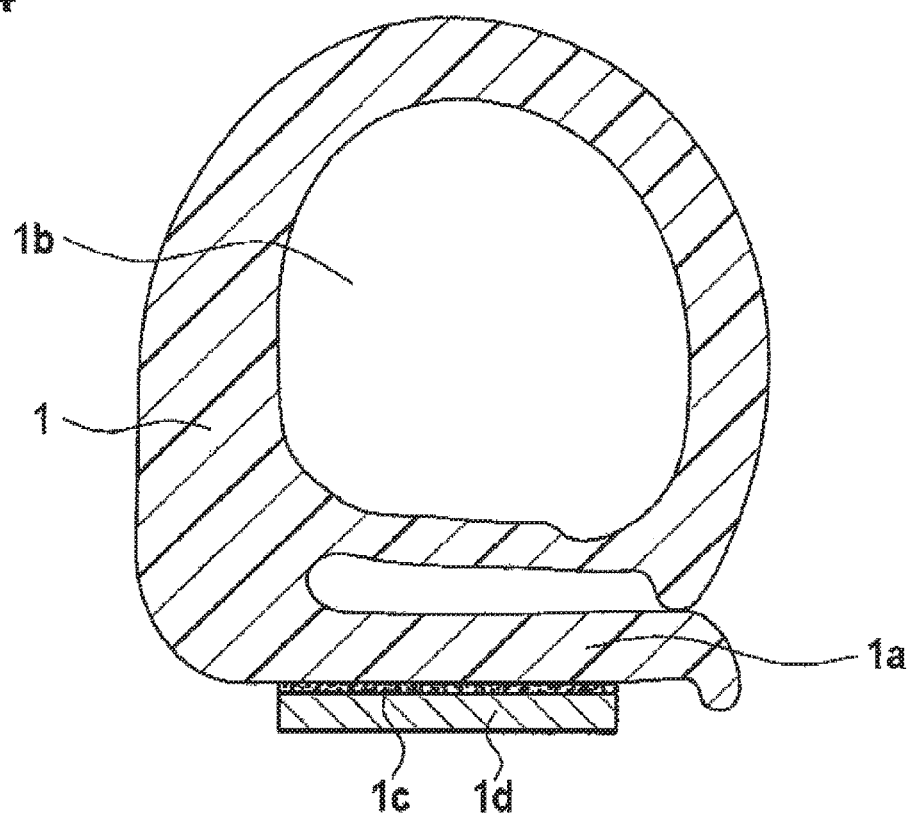
FIG. 4 is a cross-sectional view of a sealing profile.

The measuring roller 16a, meanwhile, as can be seen in particular in the diagram of FIG. 3a, has a knurling 16e around the circumference of the measuring roller 16a; this knurling is configured so that a positive connection is produced between the knurling and the protective strip 1d of the sealing profile 1. For this purpose, the knurling 16e comprises a plurality of sharp, radially outward-projecting teeth, which engage in the protective strip 1d.

Because the measuring roller 16a rolls along the sealing profile 1 without slip, the length measured by the measurement pick-up 16 corresponds to the length of the sealing profile 1 actually applied to the body part 4. When, according to the invention, the applicator head 8 with the application roller 7 moves along the application distance 19 intended for the attachment of the sealing profile 1, the drive system 10 pulls the sealing profile from a storage at the speed intended for the application distance 19 and transports it toward the application roller 7. As a result, the shaft of the measuring roller 16a is caused to rotate, and this rotation is transmitted to an encoder 16f. The signal acquired by the encoder 16f from the rotation of the shaft is processed in a control unit 16a of the application device 6 in such a way that, upon completion of the application of the sealing strip 1 along the application distance 19, the measured length of the sealing profile 1 pulled from the storage roll is compared with a nominal length of the sealing profile to be applied to the application distance 19. The nominal length can be exactly the same as the length of the application distance 19. This means that the goal is to apply the sealing profile without tension. The nominal length, however, can also be greater or less than the application distance 19, depending on whether a compression or elongation of the applied sealing profile 1 in the application distance 19 is desired. On the basis of the comparison, the control unit determines either that a compression of the sealing profile versus the nominal length of the sealing profile to be applied is present when the measured length is greater than the nominal length, or that an elongation of the sealing profile versus the nominal length of the sealing profile to be applied is present when the measured length is less than the nominal length. An output unit 16h provides an optical and/or acoustic output to make the result of the evaluation known. In particular, warning signals can be generated in cases where there is too much compression or too much elongation versus the nominal length.

So that the drive speed of the drive system 10 can be coordinated with that of the application roller 7, both the two rotating belts 10a, 10b and the application roller 7 are driven by their own servo motors.

Finally, the undesirable formation of a loop by the sealing profile 1 between the drive system 10 and the application roller 7 is monitored by a sensor 17, in particular a laser sensor.

LIST OF REFERENCE

| No. | Name |
| --- | --- |
| 1 | sealing profile |
| 1a | lip |
| 1b | empty chamber |
| 1c | adhesive strip |
| 1d | protective strip |

-continued

| No. | Name |
|---|---|
| 1e | peeled-away area |
| 2 | measurement point |
| 3 | paper |
| 4 | body part (door) |
| 5 | gap dimension |
| 6 | application device |
| 7 | application roller |
| 8 | applicator head |
| 9 | — |
| 10 | drive system |
| 10a | belt |
| 10b | belt |
| 11 | transport path |
| 11a | conveying device |
| 12 | guide channel |
| 13a, b | guide rollers |
| 14 | roller arrangement |
| 15 | take-off |
| 16 | measurement pickup |
| 16a | measuring roller |
| 16b | guide roller |
| 16c | — |
| 16d | drive |
| 16e | knurling |
| 17 | laser sensor |
| 18 | application surface |
| 19 | application distance |

The invention claimed is:

1. A method for determining at least one of an elongation and a compression of a self-adhesive sealing profile applied to a body comprising the steps:
    pulling the sealing profile from a storage and conveying the sealing profile in a conveying direction along a transport path by a drive system toward an application roller;
    applying the sealing profile by the application roller to the body along an application distance;
    peeling off a protective strip from an adhesive surface of the self-adhesive sealing profile, before the step of applying, in a section of the transport path between the drive system and the application roller; and
    measuring a length of the sealing profile pulled from the storage by a measurement pick-up comprising a measuring roller, which rolls without slip along the sealing profile in a section of the transport path located upstream of the drive system, relative to the conveying direction.

2. The method according to claim 1, further comprising, upon completion of the step of applying the sealing profile to the application distance, comparing a measured length of the sealing profile pulled from the storage measured during the step of measuring with a nominal length of the sealing profile to be applied to the application distance, wherein a compression of the sealing profile relative to the nominal length of the sealing profile to be applied is present in the application distance when the measured length is greater than the nominal length, and an elongation of the sealing profile relative to the nominal length of the sealing profile to be applied is present in the application distance when the measured length is less than the nominal length.

3. The method according to claim 2, wherein the step of comparing is performed by electronic data processing.

4. The method according to claim 1, wherein the step of applying comprises applying the sealing profile along several successive application distances in a single work step.

5. The method according to claim 1, wherein the steps of pulling and applying include conveying, by the drive system and the application roller, the sealing profile along the transport path in the same direction and at the same speed.

6. The method according to claim 1, further comprising the step of monitoring a compression of the sealing profile between the drive system and the application roller by a sensor, which detects the formation of a loop in a section of the transport path between the drive system and the application roller.

7. The method according to claim 6, wherein the step of applying the sealing profile is stopped immediately if a compression of the sealing profile between the drive system and the application roller is detected.

8. The method according to claim 1, wherein the measuring roller used in the step of measuring is disposed a transport path distance of no more than 0.25 m upstream from the drive system.

9. The method according to claim 1, wherein the step of applying the sealing profile along the application distance includes rolling the sealing profile onto an application surface of the body by the application roller.

10. The method according to claim 1, wherein the measuring roller rolls along the protective strip of the sealing profile.

11. The method according to claim 10, wherein the measuring roller used in the step of measuring is a knurled measuring roller.

12. The method according to claim 1, wherein the body to which the sealing profiled is applied is a body part of a vehicle.

13. A device for implementing the method according to claim 1, comprising:
    an applicator head with an application roller configured to roll a sealing profile with an adhesive surface onto a body,
    wherein the applicator head includes a drive system configured to pull the sealing profile from a storage and to convey the sealing profile along a transport path in a conveying direction toward the application roller;
    a take-off for peeling a protective strip from the adhesive surface of the sealing profile arranged on the applicator head along the transport path between the drive system and the application roller; and
    a measuring roller configured to roll without slip along the sealing profile when the sealing profile is conveyed along the transport path and to measure the length of the sealing profile pulled from the storage, the measuring roller being arranged on the applicator head upstream from the drive system relative to the conveying direction of the sealing profile.

14. The device according to claim 13, further comprising a data processing unit configured to compare, upon completion of the application of the sealing profile along the application distance, the measured length of the sealing profile pulled from the storage with a nominal length of the sealing profile to be applied to the application distance, wherein a compression of the applied sealing profile relative to the nominal length of the sealing profile to be applied is present if the measured length is greater than the nominal length, and an elongation of the applied sealing profile relative to the nominal length of the sealing profile to be applied is present in the application distance if the measured length is less than the nominal length.

15. The device according to claim 13, wherein the drive system comprises two endless belts, which can be brought into friction-locking contact with opposite sides of the sealing profile.

16. The device according to claim 13, further comprising a sensor in the section of the transport path between the drive system and the application roller, the sensor detecting the formation of a loop by the sealing profile associated with a compression of the sealing profile between the drive system and the application roller.

17. The device according to claim 13, wherein the measuring roller is arranged on the applicator head such that the measuring roller rolls along the protective strip of the sealing profile.

18. The device according to claim 13, wherein the measuring roller comprises a knurling.

19. The device according to claim 18, wherein the knurling comprises a plurality of sharp teeth, which are set up to engage positively in the protective strip of the sealing profile.

20. The device according to claim 13, further comprising a guide roller arranged on the applicator head such that the guide roller rolls along a side of the sealing profile facing away from the protective strip and forms a counter-support for the measuring roller.

21. The device according to claim 13, wherein the measuring roller is pressed against the sealing profile by a drive acting in the direction toward the sealing profile.

22. The device according to claim 13, wherein at least one of the drive system and the application roller comprises a servo motor.

* * * * *